F. J. SCHROEDER.
FORGED BRAKE BEAM FULCRUM.
APPLICATION FILED OCT. 28, 1915.
1,192,466.
Patented July 25, 1916.
2 SHEETS—SHEET 1.
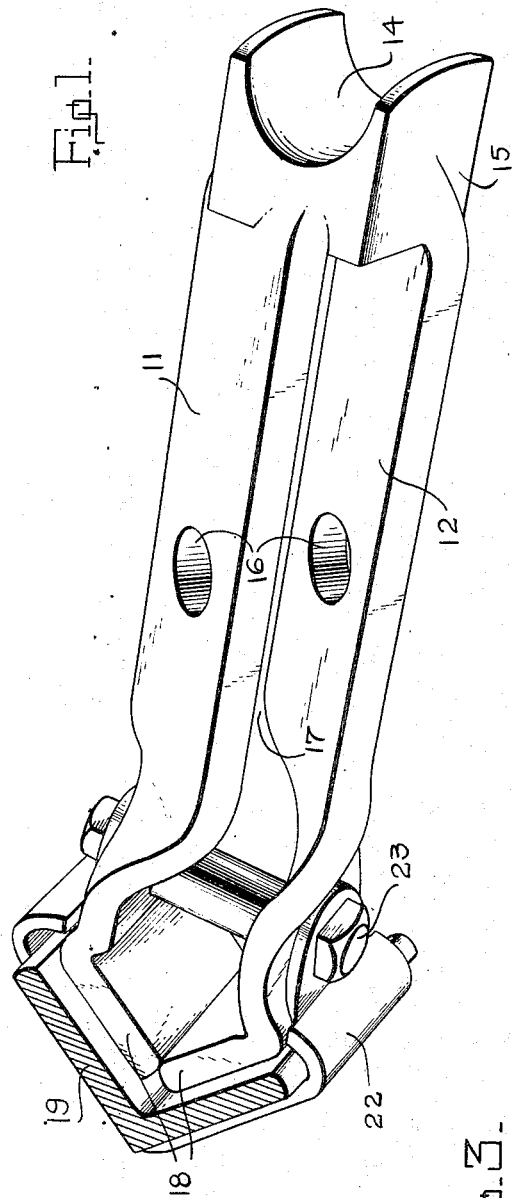
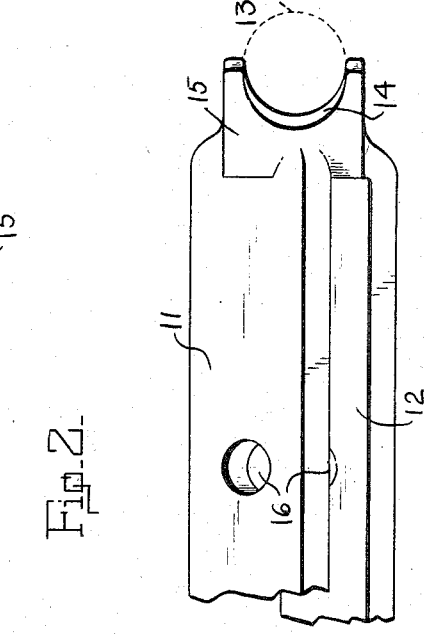
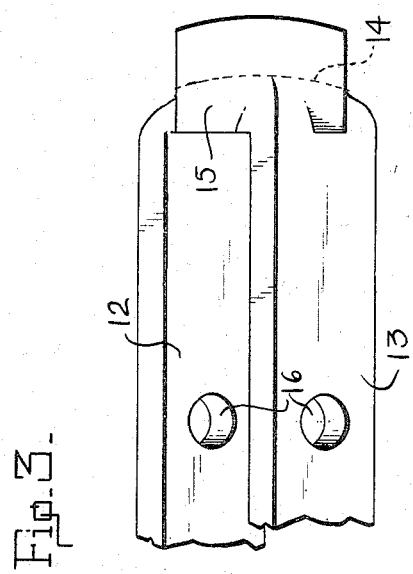
Witness
Oscar V. Payne
Inventor
Frederick J. Schroeder
By
Knight Bros
Attorneys F. J. SCHROEDER.
FORGED BRAKE BEAM FULCRUM.
APPLICATION FILED OCT. 28, 1915.
1,192,466.
Patented July 25, 1916.
2 SHEETS—SHEET 2.
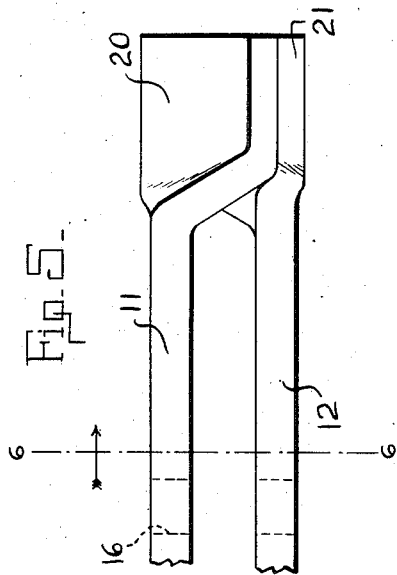
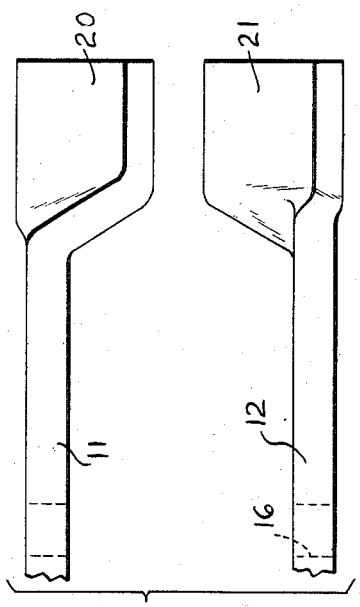
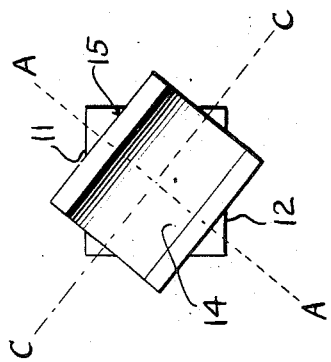
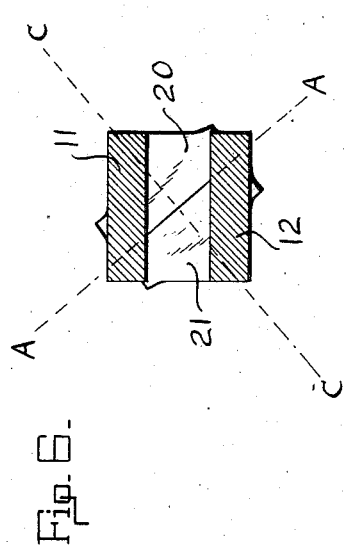
Witness
Oscar V. Payne
Inventor
Frederick J. Schroeder
By Knight Bros
Attorneys

UNITED STATES PATENT OFFICE.

FREDERICK J. SCHROEDER, OF CLEVELAND, OHIO, ASSIGNOR, BY MESNE ASSIGNMENTS, TO THE DAMASCUS BRAKE BEAM CO., OF CLEVELAND, OHIO, A CORPORATION OF OHIO, (INCORPORATED FEBRUARY 25, 1916.)

FORGED BRAKE-BEAM FULCRUM.

1,192,466. Specification of Letters Patent. Patented July 25, 1916.

Original application filed July 30, 1914, Serial No. 854,151. Divided and this application filed October 28, 1915. Serial No. 58,419.

*To all whom it may concern:*

Be it known that I, FREDERICK J. SCHROEDER, a citizen of the United States, residing at Cleveland, in the county of Cuyahoga and State of Ohio, have invented certain new and useful Improvements in Forged Brake-Beam Fulcrums, of which the following is a specification.

My invention relates to fulcrums for trussed brake beams and particularly to the class of such fulcrums called forged fulcrums, which are made by shaping up a comparatively light bar or bars of rolled steel stock, in accordance with the method described in my copending application Serial No. 854,151, filed July 30, 1914, of which this forms a divisional application. Such a fulcrum is used by introducing it in position to serve as a strut between the compression and tension members of the brake beam. It is required to have a pair of arms spaced apart to leave a slot between them for the reception of a brake lever and transverse bearings to receive a pin which passes through the arms and the brake lever in pivotally mounting the lever upon the fulcrum. It must also have suitable bearings at its respective ends to receive the compression and tension members. The slot is usually required to be in a plane inclined to the vertical and to the plane of the compression and tension members, which adds somewhat to the complication of shaping up the fulcrum and renders particularly difficult the provision of the tension member bearing at the outer end, which is required to be in the form of a seat to secure the tension member against transverse displacement under the strenuous conditions of vibration and jarring to which a brake beam is subjected in use.

It has been proposed to form a part of the tension member bearing upon each of the arms and secure the arms together by a bolt or rivet at some point adjacent to the bearing, but this has not been wholly satisfactory because of the liability of the bolt or rivet to break and permit the ends to become separated, which in turn results in destruction of the brake beam and failure of the brake; and partly because in modern practice, the length of slot required for swinging of the brake lever takes up so much of the available space between the compression and tension member bearings of the fulcrum as to render very undesirable, if not very difficult, the use of any connecting means near the tension member bearing. Moreover, the plane of the tension member bearing so far approaches the plane of the slot as to develop a considerable tendency to separate the walls of the slot and thus add to the insecurity of the riveted type of tension member bearing.

The object of the present invention is to provide a slotted brake beam fulcrum of the forged type having a block-like tension member bearing integrally united with the outer ends of the two arms, shaped to provide the reëntrant seat or depression and affording a substantial and solid bridge between them, which, notwithstanding the approach of the plane of the tension member to the plane of the slot, will resist all tendency to split the brake fulcrum, and, withal, render permanent and safe what is ordinarily a very vulnerable part of the trussed brake beam structure.

According to the preferred method of procedure, the outer end of the fulcrum is subjected to pressure in the direction of one of its dimensions while being confined in the direction of the other dimension, so that the metal accumulates in a solid block-like body integral with both arms of the fulcrum, assuming a position which adapts it to bridge from one corner to the diagonally opposite corner, and thus deliver a direct thrust upon the two arms of the fulcrum and having the metal gathered in from the other two diagonally opposite corners, so as to provide solid and substantial side walls to the seat of the tension member. The shape of the seat will, of course, depend upon the section of the tension member which it is to receive. In the illustration selected, the seat is adapted for a tension member of round section. Preferably, this shaping up of the outer end of the fulcrum blank is accomplished in a so-called heading machine, carrying a die which is forced against the end of the fulcrum while said end is confined in a suitable mold, and the metal of the fulcrum in rear of the part to be consumed in the shaping operation being firmly gripped and backed up between clamping dies; the endwise pressure being sufficient to forge the end into a single integral mass, shaped to confine the tension member on the end of the fulcrum, and solid and substantial enough to transmit thrust equally between both arms of the fulcrum and the integral bearing end with which they are thus provided. This method of procedure is not only very effective in results, but is particularly advantageous, in that it insures such results even though the two arms of the fulcrum may originally be separate pieces presented to the heading machine without any preliminary forging together or other means of uniting them.

With these preliminary observations regarding the essential features of the invention, I will proceed to describe in detail, the particular embodiment selected for purposes of illustration.

Figure 1 is a perspective view of the preferred form of my brake beam fulcrum intended for a cylindrical tension member; Fig. 2, a side elevation of a portion of the fulcrum; Fig. 3, a plan view of Fig. 2; Fig. 4, a view of the two pieces of stock for the fulcrum after the first operation; Fig. 5, the same pieces put together in position for the last operation, namely, the forming of the head; Fig. 6, a cross section along line 6—6 of Fig. 5 looking toward the right, and Fig. 7, an end view of Figs. 3 and 4, seen from the right.

The reference characters 11 and 12 designate arms or body members constituting the fulcrum, and 13 designates the tension member of the brake beam for which a head 15, with a seat 14, is provided on the fulcrum.

The body members 11 and 12 may be made either from two pieces of stock or from a single piece, which, in the latter case, then will have to be doubled up at the bend where the head is going to be formed. The two arms or body members are preferably first twisted and then bent, and the necessary holes 16 punched therein, see Fig. 4. The arms are then clamped rigidly together, see Fig. 5, leaving the necessary space or slot 17 between them, whereupon they are heated and subsequently placed in a female die. Finally, a plunger is made to advance into this die and shape and finish the head 15 with the seat 14 for the tension member 13.

It will be noted that the head 15 is placed diagonally across the two arms 11 and 12, see Figs. 6 and 7, bridging the space 17 and forming an integral part with the arms so that the pressure of the tension member will be equally distributed by both arms. The opposite two ends 18 of the body portions are bent together to form a head for the compression member 19 and the cap 22 is provided for embracing the compression member and holding it tightly against the head. A bolt 23 is drawn through the inner ends of the cap and below the head of the fulcrum to securely clamp the head, compression member and cap together.

Now the advantage of a brake beam fulcrum manufactured in this manner by forging, over a fulcrum of the same dimensions and shape made from casting material, is considerable. In the cast fulcrum the strength per square inch will be the same throughout the whole piece. The strength per square inch in the forged fulcrum, on the other hand, has been much increased in the head 15, where it is most needed, by means of the specific treatment to which the head has been exposed. The treatment is comparable with that of steel wire in which the tensile strength has been more than doubled by drawing the wire. The inherent tensile strength of the material has in the case of the fulcrum forged in this manner, been similarly increased at the place where strength is most needed, that is, at the tension member seat, by the specific treatment to which it has been exposed.

The previous twisting of the ends 20, 21 after which the head 15 is formed, relatively to the arms 11 and 12, followed by the forging and solidifying of the ends, has the further advantage that the finished head with the seat 14 is placed diagonally over the arms or members 11 and 12, or in other words, that for instance, the end 20 forming one side of the head and being a part of the member 11, has now been twisted and firmly joined, not only to the end 21, but also to the member 12, the grain of end 20 after the welding, running in to the latter member. Thus any pressure transmitted through the side of the head formed by the end 20 is transmitted to and sustained by both arms or members 11 and 12. The advantage of this over brake beams in which the slot has been stronger has been obvious, and in which the pressure is taken up over the space between the members, whereas in the present case such pressure is taken up directly over the two fulcrum members. To better illustrate this, Figs. 6 and 7 have been supplied, of which Fig. 6 shows the position of the ends 20, 21 relatively to the body members 11 and 12. Adjoining surfaces of the ends 20, 21 run along line A—A in this figure, while the axis of the tension member 13 and its seat 14 will ultimately coincide with the line C—C in the figure when the head and seat have been formed as illustrated in Fig. 7. The advantage of this will be obvious, because if the joining of the two ends 20, 21 should for some reason or other not be perfect, which is, however, most unlikely to happen, there will be no tendency to split the joint open when the axis of the tension member runs in the direction of the line C—C across the joining line A—A of the ends 20, 21.

I claim:—

1. A forged metal fulcrum for brake beams, comprising a pair of substantially parallel wrought metal arms spaced apart to provide a lever slot therebetween, said arms having their ends formed with a solid, integral head provided with a recessed seat for a truss member extending diagonally across the planes of said parallel arms, the portions of said solid head at the respective sides of the medial longitudinal plane of said recessed seat constituting originally integral portions of both of said spaced arms.

2. A forged metal fulcrum for brake beams, comprising a pair of substantially parallel wrought metal arms spaced apart to provide a lever slot therebetween, said arms having their ends formed with a solid, integral head provided with a recessed seat for a truss member extending diagonally across the planes of said parallel arms, each of the side walls of said diagonally-extending, recessed seat constituting originally integral portions of both of said spaced arms.

3. A forked metal fulcrum for brake beams, comprising a pair of substantially parallel wrought metal arms spaced apart to provide a lever slot therebetween, said arms having their ends formed with a solid, integral head extending across the entire width of said pair of parallel arms and provided with a recessed seat for a truss member extending diagonally across the planes of said arms, each of the side walls of said diagonally-extending, recessed seat constituting originally integral portions of both of said spaced arms.

The foregoing specification signed at Cleveland, Ohio, this 11th day of October, 1905.

FREDERICK J. SCHROEDER.